July 29, 1952     L. O. CARLSEN     2,604,822

METHOD OF CUTTING GEARS, FACE CLUTCHES, AND THE LIKE

Filed Nov. 1, 1946     2 SHEETS—SHEET 1

LEONARD O. CARLSEN
Inventor

July 29, 1952   L. O. CARLSEN   2,604,822
METHOD OF CUTTING GEARS, FACE CLUTCHES, AND THE LIKE
Filed Nov. 1, 1946   2 SHEETS—SHEET 2

LEONARD O. CARLSEN
Inventor

By

Attorney

Patented July 29, 1952

2,604,822

UNITED STATES PATENT OFFICE 2,604,822

METHOD OF CUTTING GEARS, FACE CLUTCHES, AND THE LIKE

Leonard O. Carlsen, Rochester, N. Y., assignor to Gleason Works, Rochester, N. Y., a corporation of New York Application November 1, 1946, Serial No. 707,079

6 Claims. (Cl. 90—9)

The present invention relates to a method of producing straight toothed gears and clutches, and in particular it relates to a method for producing straight tooth bevel gears and straight tooth face clutches.

Heretofore it has been the practice in plants, where the number of pieces of a given character to be produced on any one run is not large, and in many high-production factories, also, to finish-cut straight tooth bevel gears and straight tooth face clutch members with reciprocating planing tools. This process is, however, relatively slow because the tools cut in one direction only and on their return strokes are out of cutting position, and because the tools must be withdrawn from operative relation with the work, after they have finished a tooth space to permit indexing of the work, and must be fed back into operative position again for the cutting of the next tooth space. Moreover, if the work is being cut from the solid, the tools have to be fed depthwise into the work during the cutting of each tooth space in order to cut tooth spaces of the desired depth; which adds to the overall production time. On the other hand, if the work is to be first rough-cut and then finish-cut, two separate cutting operations are required before the tooth surfaces of the gears are finished; and this not only limits productive rate but also requires extra handling of the work. Furthermore, for these two operations separate roughing and finish-cutting equipment are ordinarily needed.

For all of these reasons, the cutting process, which is disclosed in Wildhaber Patent No. 2,357,153 of August 29, 1944, has come more and more into use in high-production shops where straight bevel gears are to be cut, because it permits of rough-cutting and finish-cutting such gears in a single operation, with a single handling, and without requiring that the cutter be withdrawn from the work for indexing of the work after a tooth space is finished, and without requiring any depthwise feed of the cutter into the work in order to cut the tooth space to the required depth.

The process of the Wildhaber patent referred to above is, however, not adapted for use on jobs where the number of gears of a particular ratio that are to be cut at one time are relatively small. The cutter is expensive; and, while it can be used for cutting gears of different ratios, the range of usefulness of a particular cutter is quite limited. Successive blades of these cutters have to be made of different effective profile shape to cut at different points along the length of a tooth space to provide the taper in width from the outer to the inner end of the tooth space required for correct bevel gears. Moreover, in the process mentioned, the cutter must be reciprocated along the length of the tooth space to be cut and the reciprocatory movement of the cutter must be timed accurately to its rotary movement. These observations apply equally to the cutting of clutches by the process mentioned, although that process has not to-date been used in production clutch manufacture.

The primary object of the present invention is to provide a method suitable for cutting straight tooth bevel gears and straight tooth face clutches in small quantities, but which will be faster than any method heretofore employed for this purpose.

Another object of the invention is to provide a method for cutting straight tooth bevel gears and straight tooth face clutches which will permit of obtaining in the field of small-production work the same advantages which have been attained in the high-production field through the use of the method of Patent No. 2,357,153 above mentioned.

A further object of the invention is to provide a method for cutting straight tooth bevel gears and straight tooth face clutch members which will have all of the advantages of the method of the above mentioned patent as regards permitting cutting of the work from the solid without feed of the cutter into depth and without requiring withdrawal of the cutter for indexing, and which, in addition, will have the advantage that no reciprocation of the cutting tool is required along the length of the tooth space to be cut, thus making it possible to employ a very simple type of machine in practicing the invention. In this respect, the invention has merit not only for small-production work but for high-production work also.

A further object of the invention is to provide a method for cutting straight tooth bevel gears and straight tooth face clutch members which can be practiced with a relatively simple, relatively inexpensive form of cutting tool.

Still another object of the invention is to provide a tool of suitable character for practicing the process of the invention.

Other objects of the invention will be apparent hereinafter from the specification and from the recital of the appended claims.

With the present invention, the gears or clutch members, which are to be produced, are form-cut, and the invention is particularly adapted to the cutting of straight bevel gears or face clutch members having plane side tooth surfaces. In the cutting operation, disc-type milling cutters are employed that have a plurality of cutting blades arranged around their peripheries with a gap between the last and first blades. The blades are preferably made with side surfaces that are of straight profile and inclined to one another at an angle equal to the included angle between the profiles of opposite sides of the tooth spaces to be cut. The side cutting edges at one side of all of the blades of a cutter are preferably made perpendicular to the axis of the cutter so that as the cutter rotates these side edges sweep out a plane surface perpendicular to the axis of the cutter. Preferably all of the blades of a cutter are sharpened so that the cutter will do all of its side-cutting with these perpendicular side-cutting edges only. This is the type of cutter illustrated in the drawings, and the invention will be described hereinafter specifically in connection with the use of this form of cutter.

The cutters are provided with both roughing and finish-cutting blades. The rough-cutting blades are preferably made of progressively increasing height; and the finishing blade or blades follow the last roughing blade and are preferably made to cut the full height of a tooth space of the work. The finishing blade or blades has or have its or their perpendicular side-cutting edge or edges off-set laterally a slight amount with reference to the perpendicular side-cutting edges of the preceding roughing blades so that the finish-cutting edge or edges will finish the whole of the height of a side of a tooth space of the work as the cutter revolves in engagement with the work. The gap between the last and first blades of the cutter is to permit indexing the work without withdrawing the cutter from engagement with the work.

In practicing the illustrated embodiment of the invention, a pair of cutters are used, one cutter having perpendicular side-cutting edges at one side and the other cutter of the pair having perpendicular side-cutting edges at its opposite side. The two cutters are positioned to cut simultaneously in the same tooth space of the work, the perpendicular side-cutting edges of one cutter cutting one side of the tooth space and the perpendicular side-cutting edges of the other cutter cutting the opposite side of the tooth space. To allow both cutters to cut simultaneously, one cutter is adjusted angularly relative to the other so that the blades of the two cutters will in effect interfit or interlock and engage the blank alternately as the cutters rotate.

The cutters are tiltably adjusted with reference to one another so that the respective planes of their perpendicular side-cutting edges are inclined to one another at the included angle between the profiles of opposite sides of the tooth space, thereby to cut the desired pressure angles on the opposite sides of the tooth space. The cutters are also inclined relative to one another so that the planes of their respective perpendicular side-cutting edges are inclined to one another in accordance with the desired lengthwise taper of the tooth spaces, thereby to produce the desired convergence of the sides of a tooth space from the outer end to the inner end thereof.

The cutters may be positioned at any desired location longitudinally of a tooth space in accordance with the point at which the greatest depth of tooth space is desired. The cutters are further positioned so that when they start to cut into a blank, the first, or shortest, roughing blade will cut first. Then, as the cutters are revolved on their respective axes in engagement with the work, the successive roughing blades of both cutters will cut progressively deeper into the blank without feed of the cutters into the work, and, when the final finishing blades of the cutters come into operative engagement with the blank, they will finish-cut the opposite sides of the tooth space for its full length. When the gaps in the cutter are abreast of the blank, the blank wil be indexed. Thus, when the cutters have made a number of revolutions equal to the number of tooth spaces to be cut in the work, the work will be completed.

Both members of a pair of toothed face clutch members may be cut without generating roll by the process of the present invention, and may thus be provided with plane side tooth surfaces which are inclined to one another at the desired presure angle and which converge from their outer to their inner ends. For bevel gears, the present process is suited only to the cutting of the non-generated member of a pair of gears, and the other member of the pair may be generated by any conventional method to mesh with the non-generated member.

Figure 1:
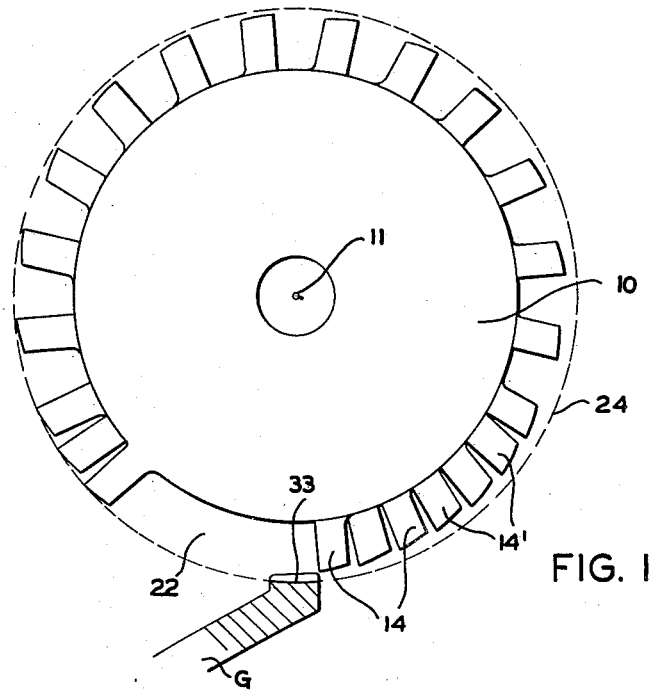
Fig. 1 is a more or less diagrammatic view showing two cutters constructed according to this invention in the process of cutting a tooth space of a bevel gear, one of the cutters being shown in elevation, and the other only fragmentarily because it is inclined away from the plane of the drawing.

Referring now to the drawings by numerals of reference, 10 and 10' denote, respectively, the two cutters of a pair of tools such as may be employed for cutting a gear or a toothed face clutch member according to this invention. Each cutter is of the disc-milling type; and the two cutters may be identical except that they are of opposite hand. Because of this relative identity of the two cutters the same reference numerals will be used in denoting like parts of the two cutters except that in the case of one cutter, these reference numerals will be primed. The axes of the two cutters are designated 11 and 11', respectively. The cutters have body portions whose opposite side surfaces 12 and 13 are plane surfaces perpendicular to the cutter axis 11.

Figure 2:
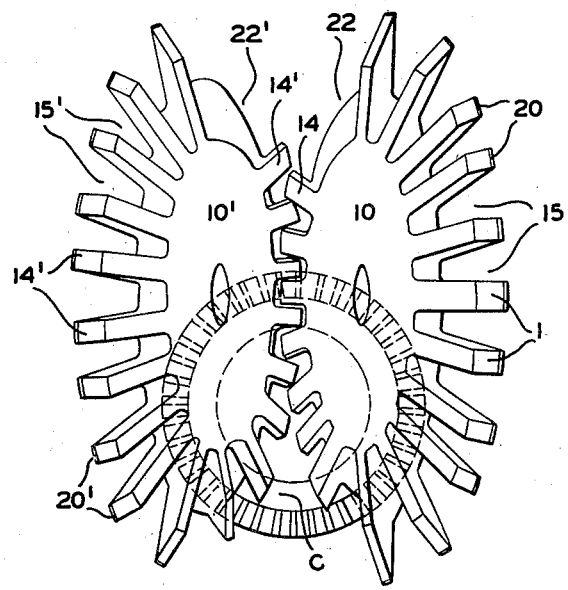
Fig. 2 is a plan view of the two interlocked cutters in engagement with the work, the work being here shown as a crown gear or toothed face clutch member.
Figure 3:
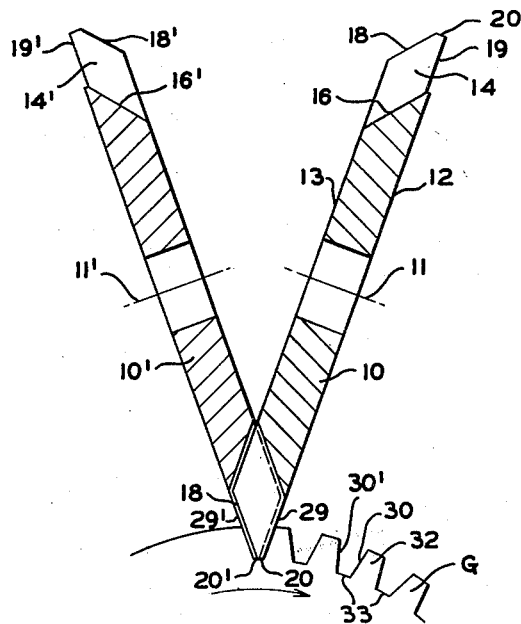
Fig. 3 is a sectional view taken at right angles to the view of Fig. 1, and further illustrating the relative positions of the cutters and work in cutting a gear according to the present invention.

In the embodiment shown in the drawings, the blades 14 and 14' of the cutters are integral with the body portions of the cutters and are formed by gashing the cutters at suitable intervals around their peripheries. The bottoms 16 or 16' of the slots between successive blades of each cutter are inclined to the axis of that cutter, and the gashes of one cutter are of sufficient angular extent to receive readily the blades of the other cutter, as the two cutters rotate together as shown in Figs. 2 and 3.

Each cutter has a plurality of roughing blades followed by one or more finish-cutting blades. The roughing blades are ground so that their cutting portions are of generally V-shape and have side edges 18 and 19, or 18' and 19', respectively, and tip edges 20 and 20', respectively. The finishing blades are also ground so that their cutting portions are of generally V-shape, and their side edges are denoted at 18 and 29, or 18' and 29', respectively, while their tip edges are denoted at 20 and 20', respectively. The finishing blades are made, so that the distance between the side edges 18 and 29 or 18' and 29' is greater than the distance between the side edges 18 and 19 or 18' and 19' of the roughing blades, so that the side edges 29 and 29' of the finishing blades are off-set laterally with reference to the corresponding side edges 19 or 19' of the roughing blades. There is a gap 22 between the last finish-cutting blade and the first roughing blade.

The side edges of the blades are of straight profile shape and inclined to one another preferably at the included angle between opposite sides of the tooth spaces of the gear or clutch member to be cut. Both the roughing and finishing blades are relieved on their side and tip surfaces back of their side and tip edges. The blades of a cutter may be sharpened so that they cut on both sides of a tooth space, or so that alternate blades will cut on opposite sides of the tooth space, but preferably they are all sharpened with the same side rake so that the cutter will cut on one side of a tooth space only and all of the blades of the cutter will have side-cutting edges at that side.

The roughing blades are made of progressively increasing height to cut progressively deeper into a tooth space of the work as the cutter revolves in engagement with the work and rough out the tooth space to its full depth. The finishing blades are adapted to finish-cut the full height of the tooth space, and if there is more than one finishing blade in a cutter, these blades are preferably made of the same height.

Because of the progressive increase in height of the roughing blades, the tip-cutting edges of successive roughing blades will lie in a spiral about the axis 11 or 11' of the cutter. This is clearly illustrated in Fig. 1 where 24 denotes a circle concentric with the axis 11 of cutter 10. As will be seen, the tips of the blades 14 of this cutter approach progressively closer and closer to this circle, and the final blade or blades, which are the finishing blades, have their tip-cutting edges 20 lying on this circle.

Figure 4:
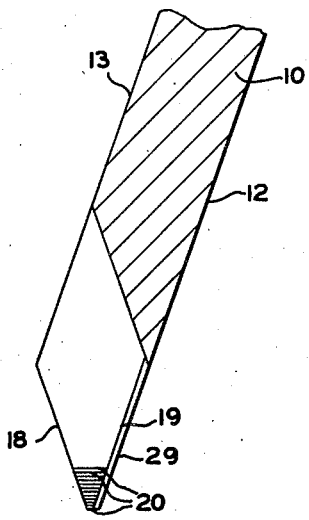
Fig. 4 is a diagrammatic view on a somewhat enlarged scale showing the roughing and finishing blades of a cutter superimposed on one another.

Preferably the side edges 18 of all of the blades of a cutter are made to lie in the same conical surface concentric with the axis 11 of the cutter. Preferably the side-cutting edges 19 of all the roughing blades of a cutter are made to lie in the same plane surface perpendicular to the axis of the cutter, but the finish-cutting blade or blades of a cutter has or have its or their side-cutting edge or edges 29 lying in a separate plane perpendicular to the axis of the cutter and off-set laterally with reference to the plane of the side-cutting edges 19 of the roughing blades, as clearly shown in Fig. 4. Hence, the finish-cutting edges 29 will sweep out and finish-cut the whole of a side of a tooth space. The roughing blades are of progressively decreasing point-width because they are of their progressively increasing height. The point-width of the finish-cutting blade or blades is, because of the lateral off-set of finishing edge 29, somewhat greater than the point-width of the final roughing blade. Fig. 4 shows diagrammatically the roughing blades and finishing blade or blades superimposed upon one another to show the progressive increase in height and progressive decrease in point-width of the roughing blades and the lateral off-set of the side-cutting edge 29 of the finishing blade with reference to the side-cutting edges 19 of the roughing blades.

In practicing the invention, whether in the cutting of a straight tooth bevel gear, such as indicated at G in Figs. 1 and 3, or in the cutting of a straight tooth face clutch member such as denoted at C in Fig. 2, two cutters are employed, which are similar, but of opposite hand as already indicated. The two cutters are positioned, as shown in Figs. 1, 2 and 3, so that their finish side-cutting edges 29 and 29' in the zone of cut are inclined to the pitch plane of the blank, which is a plane tangent to its pitch surface in the case of a bevel gear and is a plane perpendicular to its axis midway of the height of the teeth in the case of a face clutch member, at the pressure angles of the opposite side surfaces 30 and 30', respectively, of the tooth spaces of the work-piece to be cut. The cutters are further positioned so that the tip-cutting edges of their finishing blades will overlap sufficiently to cut smooth tooth space bottoms; and the cutters are further positioned so that their finish-cutting edges 29 and 29' are spaced apart a sufficient distance to cut the full width of the tooth space at the outer end of the tooth space. The cutters are still further adjusted so that the planes of their finish-cutting edges 29 and 29' will converge from the outer to the inner ends of the tooth space, as shown in Fig. 2, to cut a tooth space which will taper in width from its outer to its inner end. The cutters are also positioned relative to the work so that their blades will rough and finish the tooth spaces of the work without any relative depthwise feed between the cutters and work.

As shown in Fig. 1, the cutters have their axes lying in a plane midway the length of the tooth space. The cutters will then cut tooth space bottoms 33 which are of symmetrical curvature from end to end. The cutters, however, may be positioned in any other desired relation longitudinally of the tooth space.

When the cutters have been adjusted in the desired relation to the work, with the first roughing blades in position to engage the work first as the cutters revolve, the two cutters are rotated on their axes 11 and 11' at equal uniform velocities while the work is held stationary against rotation. As the successive blades of the two cutters approach the work they intermesh. After they have taken their cuts, they separate again. The roughing blades cut progressively deeper and deeper into the tooth space to the full depth of the tooth space. Then the final finishing-cutting edges 29 and 29' of the finishing blades sweep out the full length of the two sides 30 and 30' of the tooth space to produce side surfaces having a smooth finish. Then, when the gaps 22 and 22' of the two cutters are abreast of the work, the blank is indexed. When the first of the roughing blades of the cutters arrive abreast of the blank again, therefore, in the continued rotation of the cutters, they will enter a new tooth space of the blank to cut that tooth space. When the cutters have made as many revolutions, therefore, as there are teeth 32 in the blank to be cut, the work will have been finished. No feed of the cutter depthwise or lengthwise of the tooth space is required.

The invention is particularly adapted to the cutting of gears or clutches of narrow face width. In the embodiment shown in the drawings, the blades of a cutter are spaced uniform distances apart all around the periphery of the cutter except for the indexing gap; and this spacing is satisfactory for a gear or clutch member of the face-width shown in the drawings. It is preferred in all cases, however, that the finishing blade or blades of a cutter be spaced from one another and from the preceding roughing blade a distance greater than the face-width of the work so that only one finishing blade of a cutter will be in the tooth space at a time. In fact, it is preferred that the finishing blades of the two cutters be spaced from one another a sufficient distance that only one finishing blade will be in a tooth space of the work at a time. Thus, it is impossible for one finishing blade to come into cutting engagement with the blank while another blade is still cutting; and so the possibility of the cutting thrust of one blade on the blank effecting the cut of a finishing blade is avoided.

In the drawings, the finish-cutting edges 29 and 29' of the cutters are arranged in planes perpendicular to the axes of the respective cutters. With this construction, plane side surfaces will be cut on opposite sides of tooth spaces of the blank which converge both depthwise of the blank and lengthwise of the tooth space. A pair of toothed face clutch members cut in this manner will have, therefore, full lengthwise tooth bearing or contact. Where a localized tooth bearing is desired, that is, where less than full length tooth contact is sought, the cutters may be slightly dished, that is, the finish side-cutting edges of the cutters may be arranged in internal conical surfaces coaxial of the cutter, that is, in conical surfaces whose apices are at the same side of a plane perpendicular to the axis of the cutter as is the apex of the cone of the cutting edges 18. In this event, it is usually preferable to dish the surfaces 12 ad 12' and arrange both side-edges 19 and 29 or 19' and 29' in internal conical surfaces.

While the invention has been described in connection with a completing operation in which the tooth spaces of the work are cut from the solid, it will be understood that it may be used for rough-cutting only by using a cutter or cutters having only roughing blades, those blades being preferably of progressively increasing height as shown.

It will be understood further that while the invention has been described in connection with a particular embodiment thereof and in connection with particular uses for that embodiment, it is capable of further modification and use, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of cutting a toothed member which has teeth converging longitudinally toward a common center which comprises cutting the sides of its teeth by positioning a rotary disc-milling cutter, which has cutting blades of progressively increasing height arranged partway only around its periphery with a gap between the last and first blades, each of the blades having a side and a tip-cutting edge, the side-cutting edges at one side of the blades being of straight profile shape, in full-depth cutting engagement with the work so that the cutter axis is offset a predetermined distance from the center of the work and so that the said straight-profiled side-cutting edges of the cutter are inclined to the pitch plane of the work at the pressure angle of the tooth surfaces to be cut and so that the blades will cut progressively to the full depth of a tooth space of the work, as the cutter rotates, without depthwise feed of the cutter into the work, rotating the cutter in engagement with the work while holding the work stationary on its axis and while maintaining the cutter axis at said predetermined offset from the center of the work, and indexing the work on each revolution of the cutter when the gap in the cutter is abreast of the work.

2. The method of cutting a toothed member which has teeth converging longitudinally toward a common center which comprises employing a pair of rotary disc-milling cutters, each of which has a plurality of cutting blades of progressively increasing height arranged partway only around the periphery of the cutter with a gap between the last and first blades, the cutting blades of the two cutters having opposite side-cutting edges, respectively, of straight profile, positioning said cutters in full-depth cutting engagement with the work so that their axes are offset predetermined distances from the center of the work and so that the said opposed side-cutting edges of the two cutters are inclined to the pitch plane of the work at the pressure angles, respectively, of opposite sides of the teeth of the work and so that the blades of the two cutters will intermesh at the zone of their engagement with the work and so that the blades will cut progressively to the full depth of a tooth space of the work, as the cutters rotate, without depthwise feed of the cutters into the work, rotating the cutters at equal velocities on their respective axes while maintaining the cutters at said predetermined offsets from the center of the work, and indexing the work when the gaps in the two cutters are abreast of the work.

3. The method of cutting a toothed member which has teeth converging longitudinally toward a common center which comprises positioning a pair of rotary disc-milling cutters, each of which has a plurality of cutting blades of progressively increasing height arranged partway only around its periphery with a gap between its last and first blades, the blades of the two cutters having opposite side-cutting edges, respectively, of straight profile that lie in planes perpendicular to the axes of the two cutters, respectively, positioning said cutters in engagement with the work so that their axes are offset predetermined distances from the center of the work and so that the opposite side-cutting edges of the two cutters are inclined to the pitch plane of the work at the pressure angles, respectively, of opposite sides of the teeth of the work and so that the blades of the two cutters will intermesh at the zone of their engagement with the work and so that the blades will cut progressively to the full depth of a tooth space of the work, as the cutters rotate, without depthwise feed of the cutters into the work, rotating the cutters at equal velocities on their respective axes while maintaining the cutter axes at their predetermined offsets from the center of the work, and indexing the work when the gaps in the two cutters are abreast of the work.

4. The method of cutting a toothed member which has teeth converging longitudinally toward a common center which comprises employing a pair of rotary disc-milling cutters, each of which has a plurality of roughing blades followed by one or more finishing blades arranged partway around its periphery with a gap between the last and first blades, the roughing blades of each cutter having side-cutting edges at one side which are of straight profile and lie in a common surface of revolution, the side-cutting edges of the roughing blades of the two cutters being adapted to cut at opposite sides, respectively, and the finishing blades of the two cutters having side-cutting edges, respectively, adapted to cut at the same side of a tooth space as the roughing blades of the two cutters, respectively, the finishing side-cutting edges of the two cutters being off-set laterally, respectively, with reference to the side-cutting edges of the roughing blades of the two cutters, respectively, positioning the two cutters in full-depth cutting engagement with the work so that their axes are offset predetermined distances from the center of the work and so that the opposite side-cutting edges of the two cutters are inclined to the pitch plane of the work at the pressure angles, respectively, of opposite sides of the teeth of the work and so that the blades of the two cutters will intermesh at the zone of their engagement with the work and so that the roughing blades will cut to the full depth of a tooth space of the work, as the cutters rotate, without depthwise feed of the cutters into the work, and rotating the cutters at equal velocities on their respective axes while maintaining the axes of the cutters at their predetermined offsets from the center of the work, and indexing the work when the gaps in the two cutters are abreast of the work.

5. The method of cutting a toothed member which has teeth converging longitudinally toward a common center which comprises cutting the sides of its teeth by positioning a rotary disc-milling cutter, which has rough cutting blades of progressively increasing height followed by a finishing blade arranged part way only around its periphery with a gap between the last and first blades, all of the blades having a side cutting edge at one and the same side which is of straight profile, the side-cutting edge at said one side of the finishing blade being offset laterally with reference to the corresponding side cutting edges of the roughing blades, in full-depth cutting engagement with the work so that the axis of the cutter is offset from the center of the work a predetermined distance and so that said side cutting edges are inclined to the pitch plane of the work at the pressure angle of the tooth surfaces to be cut and so that the cutter will cut to the full depth of a tooth space of the work, during rotation of the cutter, without depthwise feed of the cutter into the work, rotating the cutter in engagement with the work while holding the work stationary on its axis and while maintaining the cutter axis at said predetermined offset from the center of the work, and indexing the work on each revolution of the cutter when the gap in the cutter is abreast of the work.

6. The method of cutting a toothed member which has teeth converging longitudinally toward a common center which comprises positioning a pair of rotary disc-milling cutters, each of which has cutting blades arranged part way only around its periphery with a gap between the last and first blades, in full-depth cutting engagement with the work so that the axes of the two cutters are offset predetermined distances from the center of the work and are inclined to one another in accordance with the pressure angles of opposite sides of the tooth spaces to be cut in the work, and so that the blades of the two cutters will intermesh at the zone of their engagement with the work and so that the cutters will cut to the full depth of a tooth space of the work without depthwise feed into the work, and rotating the cutters at equal velocities on their respective axes while maintaining the cutter axes at said predetermined offsets from the center of the work, and indexing the work when the gaps in the two cutters are abreast of the work.

LEONARD O. CARLSEN.

REFERENCES CITED

The following references are of record in the file of this patent:

UNITED STATES PATENTS

| Number | Name | Date |
|---|---|---|
| 1,370,573 | Wingquist | Mar. 8, 1921 |
| 1,474,500 | Wingquist | Nov. 20, 1923 |
| 1,579,888 | Raszl | Apr. 6, 1926 |
| 2,267,182 | Wildhaber | Dec. 23, 1941 |
| 2,315,147 | Wildhaber | Mar. 30, 1943 |
| 2,327,296 | Wildhaber | Aug. 17, 1943 |
| 2,357,153 | Wildhaber | Aug. 29, 1944 |
| 2,398,763 | Bagne | Apr. 23, 1946 |

FOREIGN PATENTS

| Number | Country | Date |
|---|---|---|
| 535,236 | Germany | Oct. 9, 1931 |